United States Patent
Agrawal et al.

(10) Patent No.: US 9,501,475 B2
(45) Date of Patent: Nov. 22, 2016

(54) SCALABLE LOOKUP-DRIVEN ENTITY EXTRACTION FROM INDEXED DOCUMENT COLLECTIONS

(71) Applicant: Microsoft Corporation, Redmond, WA (US)

(72) Inventors: Sanjay Agrawal, Sammamish, WA (US); Kaushik Chakrabarti, Redmond, WA (US); Surajit Chaudhuri, Redmond, WA (US); Venkatesh Ganti, Redmond, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 65 days.

(21) Appl. No.: 14/294,791

(22) Filed: Jun. 3, 2014

(65) Prior Publication Data

US 2014/0351274 A1 Nov. 27, 2014

Related U.S. Application Data

(62) Division of application No. 12/144,675, filed on Jun. 24, 2008, now Pat. No. 8,782,061.

(51) Int. Cl.
| | | |
|---|---|---|
| *G06F 17/00* | (2006.01) | |
| *G06F 7/00* | (2006.01) | |
| *G06F 17/30* | (2006.01) | |
| *G06F 17/27* | (2006.01) | |

(52) U.S. Cl.
CPC ....... *G06F 17/30011* (2013.01); *G06F 17/278* (2013.01)

(58) Field of Classification Search
USPC ........................................ 707/622, 755, 802
See application file for complete search history.

(56) References Cited

U.S. PATENT DOCUMENTS

| | | | |
|---|---|---|---|
| 6,131,082 A | 10/2000 | Hargrave, III et al. | |
| 6,131,092 A * | 10/2000 | Masand | G06F 17/30985 |
| 6,389,412 B1 * | 5/2002 | Light | G06F 17/30719 |
| | | | 707/825 |
| 6,393,389 B1 * | 5/2002 | Chanod | G06F 17/271 |
| | | | 704/4 |
| 6,678,681 B1 | 1/2004 | Brin | |
| 6,792,414 B2 | 9/2004 | Chaudhuri et al. | |
| 7,260,570 B2 | 8/2007 | Brown et al. | |
| 7,356,527 B2 | 4/2008 | Carmel et al. | |
| 7,644,097 B2 * | 1/2010 | Yamamoto | G06F 17/30613 |
| | | | 707/999.101 |

(Continued)

OTHER PUBLICATIONS

Popov et al., "Towards Semantic Web Information Extraction", in Human Language Technologies Workshop. AI 2nd International Semantic Web Conference (ISWC2003), Florida, USA, Oct. 13, 2003, 21 pages.

(Continued)

*Primary Examiner* — Kuen Lu
(74) *Attorney, Agent, or Firm* — Alin Corie; Sandy Swain; Micky Minhas

(57) ABSTRACT

A set of documents is filtered for entity extraction. A list of entity strings is received. A set of token sets that covers the entity strings in the list is determined. An inverted index generated on a first set of documents is queried using the set of token sets to determine a set of document identifiers for a subset of the documents in the first set. A second set of documents identified by the set of document identifiers is retrieved from the first set of documents. The second set of documents is filtered to include one or more documents of the second set that each includes a match with at least one entity string of the list of entity strings. Entity recognition may be performed on the filtered second set of documents.

20 Claims, 8 Drawing Sheets

(56) References Cited

U.S. PATENT DOCUMENTS

| | | | |
|---|---|---|---|
| 2002/0059219 A1* | 5/2002 | Neveitt | G06F 17/30595 |
| 2004/0049505 A1 | 3/2004 | Pennock | |
| 2004/0199498 A1* | 10/2004 | Kapur | G06F 17/30672 |
| 2005/0234906 A1 | 10/2005 | Ganti et al. | |
| 2007/0078850 A1 | 4/2007 | Aziz et al. | |
| 2007/0078880 A1 | 4/2007 | Eiron et al. | |
| 2007/0203746 A1* | 8/2007 | DeHaan | G06Q 50/22 705/2 |
| 2008/0027933 A1 | 1/2008 | Hussam | |
| 2008/0082501 A1* | 4/2008 | Hardy | G06F 17/30864 |
| 2008/0140616 A1* | 6/2008 | Encina | G06F 17/30864 |
| 2009/0182729 A1* | 7/2009 | Lu | G06F 17/30867 |
| 2009/0281970 A1* | 11/2009 | Mika | G06F 17/2785 706/12 |
| 2009/0300014 A1* | 12/2009 | Chakrabarti | G06F 17/30707 |
| 2009/0313115 A1* | 12/2009 | Konig | G06Q 30/02 705/14.45 |

OTHER PUBLICATIONS

Holmes et al., "Use of Query Concepts and Information Extraction to Improve Information Retrieval Effectiveness", Proceedings of the Seventh Text Retrieval Conference (TREC), sponsored by the National Institute of Standards and Technology and Advanced Research Projects Agency, 1998, 10 pages.

Cheng et al., "Supporting Entity Search: A Large-Scale Prototype Search Engine", Proceedings of the 2007 ACM SIGMOD international conference on Management of data, Beijing, China, Jun. 11-14, 2007, pp. 1144-1146.

Agichtein et al., "Querying Text Databases for Efficient Information Extraction", Proceedings of 19th International Conference on Data Engineering, ICDE, 2003, Publication Date: Mar. 5-8, 2003, pp. 113-124.

Aho et al., "Efficient String Matching: An Aid to Bibliographic Search", Communications of the ACM, vol. 18 No. 6, Jun. 1975, pp. 333-340.

Cafarella et al., "A Search Engine for Natural Language Applications", Proceedings of the 14th international conference on World Wide Web, Chiba, Japan, May 10-14, 2005, pp. 442-452.

Chandel et al., "Efficient Balch Top-k Search for Dictionary-based Entity Recognition", ICDE, Proceedings of the 22nd International Conference on Data Engineering, 2006, Publication Date: Apr. 3-7, 2006, pp. 28-37.

Chaudhuri et al., "Factorizing Complex Predicates in Queries to Exploit Indexes", Proceedings of the 2003 ACM SIGMOD international conference on Management of data,San Diego, CA, Jun. 9-12, 2003, pp. 361-372.

Cohen et al., "Exploiting Dictionaries in Named Entity Extraction: Combining Semi-Markov Extraction Processes and Data Integration Methods", Proceedings of the tenth ACM SIGKDD international conference on Knowledge discovery and data mining, Aug. 22-25, 2004, Seattle, Washington, USA, pp. 89-98.

De Rose et al., "DBLife: A Community Information Management Platform for the Database Research Community", (Demonstration), CIDR 2007, 4 pages.

Etzioni et al., "Web-Scale Information Extraction in KnowiltAll", Proceedings of the 13th international conference on World Wide Web, New York, USA, May 17-22, 2004, pp. 100-110.

Gamon, Michael , "Sentiment Classification on Customer feedback data: noisy data, large feature vectors, and the role of linguistic analysis", International Conference on Computational Linguistics: Proceedings of the 20th international conference on Computational Linguistics, Geneva, Switzerland, Article No. 841, 2004, 7 pages.

Grishman, Ralph, "Information Extraction: Techniques and Challenges", Lecture Notes in Computer Science; vol. 1299, International Summer School on Information Extraction: A Multidisciplinary Approach to an Emerging Information Technology, Year of Publication: 1997, pp. 10-27.

Klein et al.. "Approximation algorithms for NP-hard optimization problems", Algorithms and Theory of Computation Handbook, CRC Press, 1999, 1-23 pages.

Ipeirotis et al., "To Search or to Crawl? Towards a Query Optimizer for Text-Centric Tasks", Proceedings of the 2006 ACM SIGMOD international conference on Management of data, Chicago, Illinois, USA, Jun. 27-29, 2006, pp. 265-276.

Lafferty et al., "Conditional Random Fields: Probabilistic Models for Segmenting and Labeling Sequence Data", Proceedings of the Eighteenth International Conference on Machine Learning, Jun. 28-Jul. 1, 2001, pp. 282-289.

Sarawagi et al., "Efficient set joins on similarity predicates", Proceedings of the 2004 ACM SIGMOD international conference on Management of data, Paris, France, Jun. 13-18, 2004, pp. 743-754.

Sebastian I, Fabrizio, "Machine Learning in Automated Text Categorization", ACM Computing Surveys, vol. 34, No. 1, Mar. 2002, 1-47 pages.

Witten et al.,"Managing Gigabytes Compressing and Indexing Documents and Images", 1999, pp. 117-161.

Wu et al.,"A Fast Algorithm for Multi-pattern Searching", Tech. Rep. TR94-17, Department of Computer Science, University of Arizona, May 1994, pp. 1-11.

Brin et al.,"The Anatomy of a Large-Scale Hypertextual Web Search Engine", Computer Networks and ISDN Systems, vol. 30, Issue 1-7, 1998, 18 pages.

Appelt, et al.,"Introduction to Information Extraction Technology", IJCAI-99 Tutorial, Stockholm, Sweden, ,,Aug. 2, 1999, 4 Pages.

Arasu, et al., "Efficient Exact Set-Similarity Joins", Proceedings of the 32nd international conference on Very large data bases, Sep. 12-15, 2006, pp. 918-929.

Cormen et al., "Introduction to Algorithms", 3rd Edition, The MIT Press, Cambridge, Massachusetts, 2009, 6 pages.

* cited by examiner

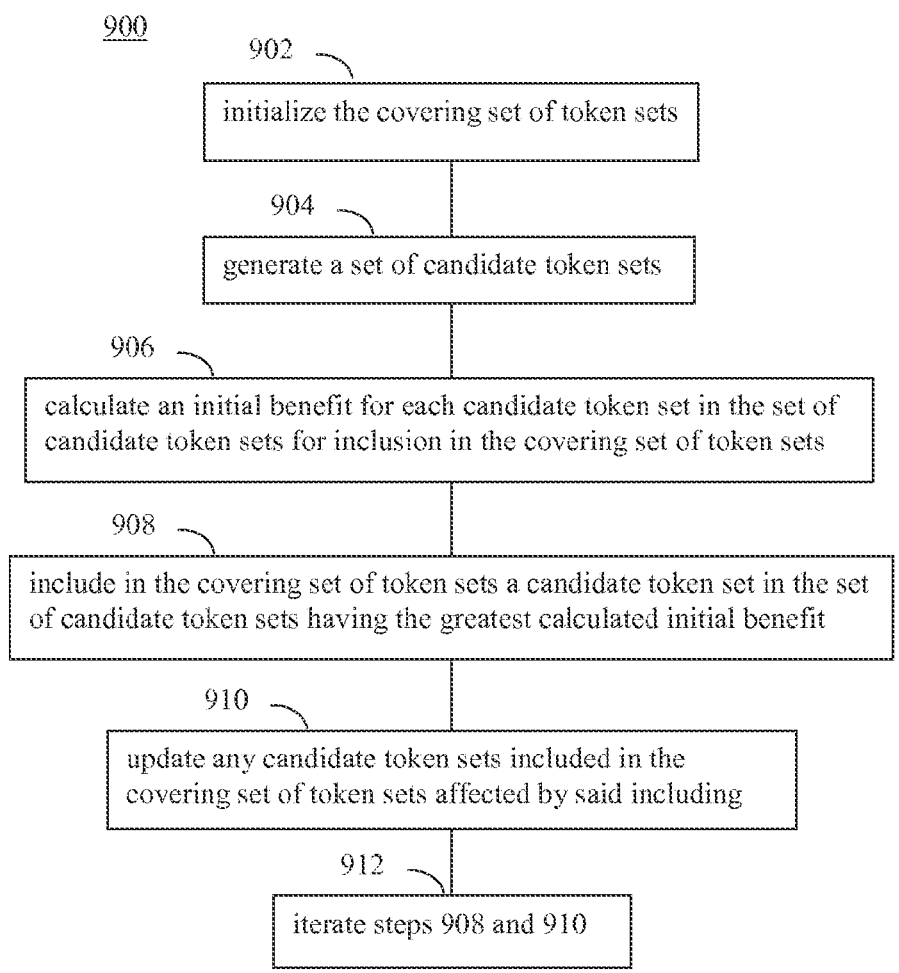

SCALABLE LOOKUP-DRIVEN ENTITY
EXTRACTION FROM INDEXED
DOCUMENT COLLECTIONS

CROSS-REFERENCE TO RELATED
APPLICATIONS

This application is a divisional application of U.S. patent application Ser. No. 12/144,675, titled "Scalable Lookup-Driven Entity Extraction from Indexed Document Collections," filed on Jun. 24, 2008, which is incorporated by reference herein in its entirety.

BACKGROUND

Entity extraction (also known as "named entity recognition" and "entity identification") is a form of information extraction that may be performed on large sets of documents. Entity extraction may be performed to locate and classify entity strings (strings of words) in the text of the documents into predefined categories such as the names of persons, places, times, things, quantities, monetary values, percentages, organizations, etc. Extraction of entity strings from documents is important for enabling data analysis over unstructured data.

Commercially available entity extractors exist for a variety of entity types such as people names, product names and locations. Current entity extraction techniques are primarily based on machine learning (ML) and natural language processing (NLP) techniques. Such techniques process each document of the document set, and thus can be very expensive, particularly when thousands of documents or more are being processed. Thus, more efficient ways of performing entity extraction are desired.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Documents of an input set of documents are filtered to produce a filtered set of documents that may be used for entity extraction. A reference list of entity strings is received. A covering set of token sets is generated from the reference list. The covering set of token sets is used to filter the set of documents in a manner that reduces an overall extraction cost.

In accordance with one implementation, a system for filtering a set of documents is provided. The system includes a document identifier filter, a document retriever, and an entity string matcher. The document identifier filter includes a covering token set determiner and an inverted index querier. The covering token set determiner is configured to receive a list of entity strings and to determine a set of token sets that covers the entity strings in the list. The inverted index querier is configured to query an inverted index generated on a first set of documents using the covering set of token sets to determine a set of document identifiers for a subset of the documents in the first set. The document retriever is configured to retrieve from the first set of documents a second set of documents identified by the set of document identifiers. The entity string matcher is configured to filter the second set of documents to include one or more documents of the second set that each includes a match with at least one entity string of the list of entity strings.

The system may further include an entity recognition module configured to perform entity recognition on the filtered second set of documents.

Methods for filtering documents are also described. In one method, a list of entity strings is received. A set of token sets that covers the entity strings in the list is determined. An inverted index generated on a first set of documents is queried using the covering set of token sets to determine a set of document identifiers for a subset of the documents in the first set. A second set of documents identified by the set of document identifiers is retrieved from the first set of documents. The second set of documents is filtered to include one or more documents of the second set that each includes a match with at least one entity string of the list of entity strings. Entity recognition may be performed on the filtered second set of documents.

A computer program product is also described herein. The computer program product includes a computer-readable medium having computer program logic recorded thereon for enabling a computer to filter documents.

In accordance with one implementation of the computer program product, the computer program logic includes first, second, third, and fourth means. The first means is for enabling the processing unit to determine a set of token sets that covers all entity strings in a list of entity strings. The second means is for enabling the processing unit to query an inverted index generated on a first set of documents using the covering set of token sets to determine a set of document identifiers for a subset of the documents in the first set. The third means is for enabling the processing unit to retrieve from the first set of documents a second set of documents identified by the set of document identifiers. The fourth means is for enabling the processing unit to filter the second set of documents to include one or more documents of the second set that each includes a match with at least one entity string of the list of entity strings.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE
DRAWINGS/FIGURES

The accompanying drawings, which are incorporated herein and form a part of the specification, illustrate the present invention and, together with the description, further serve to explain the principles of the invention and to enable a person skilled in the pertinent art to make and use the invention.

FIG. 8 shows a process that may be performed to determine a covering set of token sets, according to an example embodiment.

FIG. 9 shows a flowchart for performing a greedy heuristic to select a set of covering token sets to reduce document filtering costs, according to an example embodiment.

Figure 1:
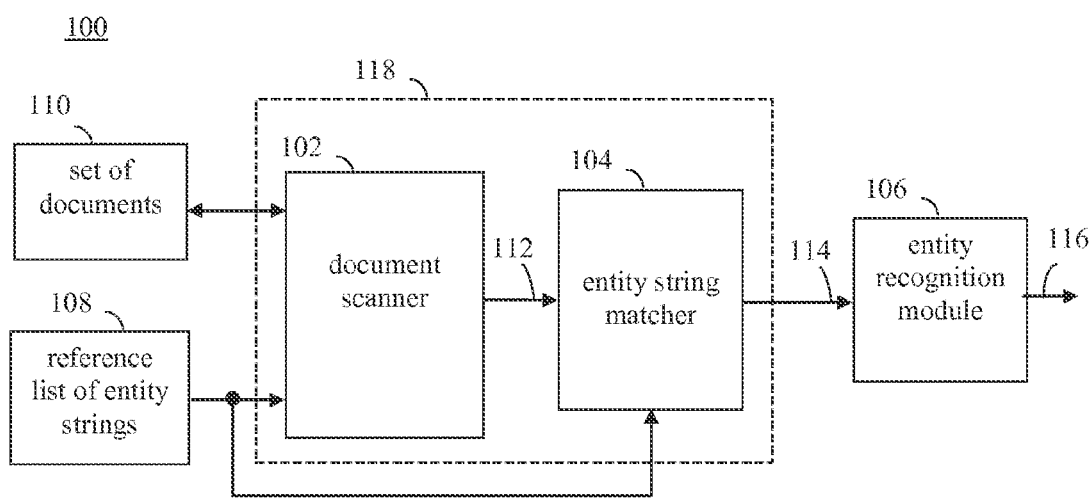
FIGS. 1 and 2 show block diagrams of systems for performing entity extraction.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

Introduction

The present specification discloses one or more embodiments that incorporate the features of the invention. The disclosed embodiment(s) merely exemplify the invention. The scope of the invention is not limited to the disclosed embodiment(s). The invention is defined by the claims appended hereto.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Entity Extraction Techniques

Entity extraction (also known as "named entity recognition" and "entity identification") is a form of information extraction that may be performed on large sets of documents. Entity extraction may be performed to locate and classify entity strings (strings of words) in the text of the documents into predefined categories such as the names of persons, places, times, things, quantities, monetary values, percentages, organizations, etc. Extraction of entity strings from documents is important for enabling data analysis over unstructured data.

Figure 2:
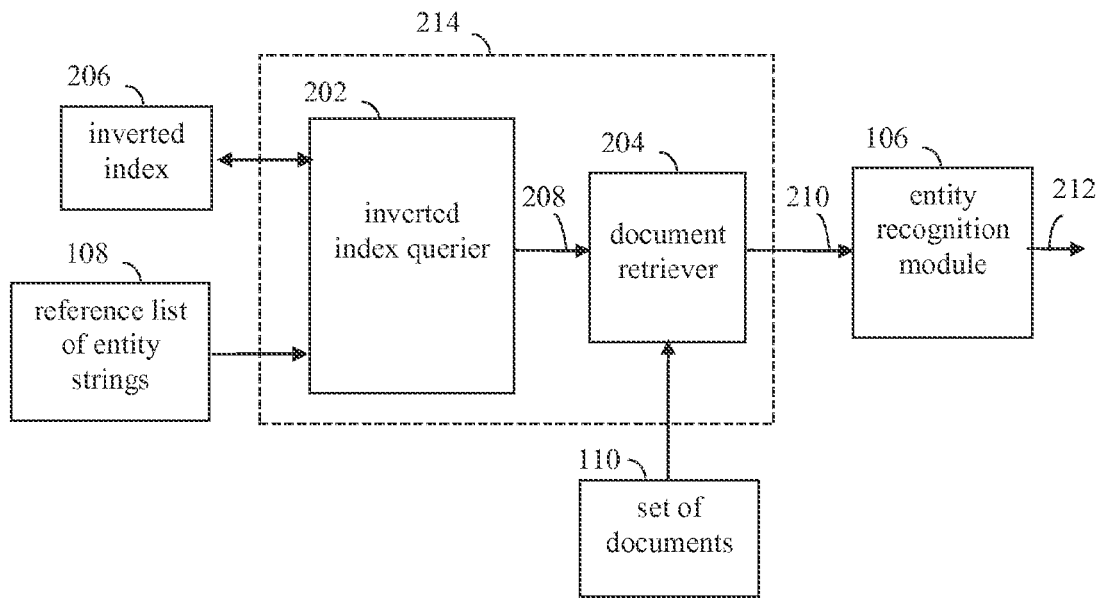

FIGS. 1 and 2 show block diagrams of example systems for performing entity extraction. FIGS. 1 and 2 are described as follows. FIG. 1 shows a block diagram of a document scan system 100 configured to perform entity extraction on a set of documents 110. Set of documents 110 may include any number of documents, including tens, hundreds, thousands, and even larger numbers of documents. Set of documents 110 may include any type of documents, including news articles, publications, papers, books, web-based documents, etc. As shown in FIG. 1, system 100 includes a document filter 118 and an entity recognition module 106. Document filter 118 includes a document scanner 102 and an entity string matcher 104. Document filter 118 is configured to filter documents of set of documents 110 to reduce a number of documents that are processed by entity recognition module 106.

As shown in FIG. 1, document scanner 102 receives a reference list 108 of entity strings and set of documents 110. Reference list 108 lists any number of entity strings, including tens, hundreds, thousands, and even larger numbers of entity strings. Reference list 108 may be generated by, and received from a user, such as a person performing research on one or more topics. The user may include in reference list 108 any number of entity strings in which the user is interested. For example, the user may be performing research on things (e.g., products), places, persons, etc. In an example application, the user may be performing research on electronic devices. In such an application, the user may include a variety of entity strings in reference list 108 related to electronic devices, such as the following example entity strings listed as follows:

---

Sony Vaio FS740
Sony Vaio VX88P
Sony Playstation 3
XBox 360 Core System
XBox 360 Wireless Controller

---

An entity string may include any number of one or more words, referred to herein as "tokens." For example, the entity string "Sony Vaio FS740" includes three tokens—"Sony," "Vaio," and "FS740." Although referred to herein as a "list," reference list 108 may be embodied in various ways, including as other type of data structure such as a text file, a table, a data array, a database, etc., that is capable of containing entity strings.

Document scanner 102 is configured to access each document in set of documents 110 in a one-by-one fashion. As shown in FIG. 1, document scanner 102 outputs the accessed documents one-by-one as scanned documents 112.

Entity string matcher 104 receives accessed documents 112 and reference list 108. As each document is received on scanned documents 112, entity string matcher 104 determines whether the received document includes one or more entity strings of reference list 108. All tokens of an entity string must be included in a scanned document, and the tokens of the entity string must sequentially appear in the scanned document in the order provided in reference list 108, for entity string matcher 104 to determine that the scanned document includes the entity string. Entity string matcher 104 may be configured in a variety of ways to perform this determination, including being configured to perform standard string matching techniques. As shown in FIG. 1, entity string matcher 104 outputs the documents determined to include one or more of the entity strings of reference list 108 as filtered documents 114.

Entity recognition module 106 receives filtered documents 114. Entity recognition module 106 is configured to recognize true mentions of entities in the filtered documents 114. For example, entity recognition module 106 may be configured to analyze the filtered documents 114 using machine learning (ML) and/or natural language processing (NLP) techniques to ensure that entity strings matched in filtered documents 114 are actually references to a desired entity and are not other uses of the entity strings, such as a generic phrase references.

For example, a user may desire to perform research on particular movies, including a movie titled "60 Seconds." The movies may be listed in reference list 108 and provided to system 100, which may be used to determine documents of interest with regard to the movies. Document filter 118 may filter set of documents 110 according to reference list 108, and entity recognition module 106 may receive filtered documents 114 from document filter 188. Filtered documents 114 include documents that include movie-related entity strings from reference list 108, including the entity string "60 Seconds." However, while in some cases "60 Seconds" may refer to the movie, "60 Seconds" may also refer to time. Thus, filtered documents 114 may include mentions of the entity string "60 Seconds" in reference to the movie and mentions of the entity string "60 Seconds" in reference to time. Entity recognition module 106 may use ML and/or NLP techniques to distinguish between mentions of the entity string "60 Seconds" in reference to the movie and mentions of the entity string "60 Seconds" in reference to time, identifying in filtered documents 114 the mentions of the string "60 Seconds" in reference to the movie. Such ML and NLP techniques will be known to persons skilled in the relevant art(s).

As shown in FIG. 1, entity recognition module 106 generates extracted information 116. Extracted information 116 may include a set of document identifiers for documents of filtered documents 114 that include entity strings of reference list 108, as determined according to the ML and/or NLP techniques. Furthermore, extracted information 116 may include a list generated by entity recognition module 106 for each identified document of the one or more entity strings included in the identified document.

System 100 may be used in an "ad-hoc" entity extraction scenario, where users can dynamically provide new or updated reference lists 108. For each processed reference list 108, document filter 118 must scan and process all documents in set of documents 110, because the results of prior processed reference lists 108 are not typically useable for subsequent iterations of entity extraction. Thus, processing each reference list 108 by system 100 can be a relatively time consuming and resource intensive task.

FIG. 2 shows a block diagram of a phrase query system 200 configured to perform ad-hoc entity extraction on set of documents 110. System 200 may perform more efficiently in some cases than system 100 shown in FIG. 1 due to an inverted index 206, which enables keyword searching. As shown in FIG. 2, system 200 includes a document filter 214 and entity recognition module 106. Document filter 214 includes an inverted index querier 202 and a document retriever 204. Document filter 214 is configured to filter documents of set of documents 110 to reduce a number of documents that are processed by entity recognition module 106.

Figure 3:
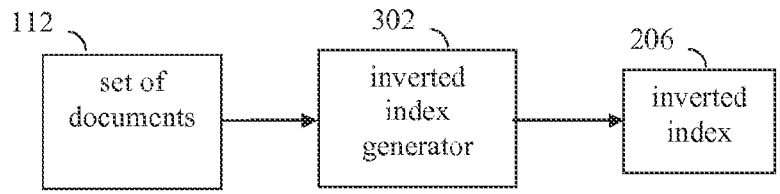
FIG. 3 shows a block diagram of a system for generating an inverted index.

As shown in FIG. 2, inverted index querier 202 receives reference list 108 and inverted index 206. As described above, reference list 108 may be submitted by a user, and may include a plurality of entity strings. Inverted index 206 is an inverted index generated on set of documents 110. Inverted index 206 is a mapping of tokens to the locations of the tokens in documents of set of documents 110. Inverted index 206 may be generated in various ways, as would be known to persons skilled in the relevant art(s). For example, FIG. 3 shows a block diagram of a system 300 for generating inverted index 206. As shown in FIG. 3, system 300 includes an inverted index generator 302. Inverted index generator 302 receives set of documents 110. Inverted index generator 302 identifies tokens in each of the documents in set of documents 110. Inverted index generator 302 generates a list of identified tokens, and for each token in the list, generates a list of one or more document identifiers that identify the documents in which the token is located (which may be referred to as a "Doc ID" set or "docid" set). The document identifiers may have any suitable form, including a document file name, a numerical identifier for a document, etc. Each token and corresponding list of document identifiers may be provided in inverted index 206 in any form, including as a record.

For example, a first document may include the text "Sony Vaio laptop," a second document may include the text "Sony Playstation video games," and a third document may include the phrase "I use my Vaio" Each word or combination of words of these phrases may be indexed as a token or combination of tokens by inverted index generator 302. With regard to the tokens "Sony," "Vaio," and "Playstation," and the token pair "Sony Vaio," inverted index generator 302 may generate entries in inverted index 206 as follows:

| | |
|---|---|
| "Sony": | {0, 1} |
| "Vaio": | {0, 2} |
| "Playstation": | {1} |

In the above example entries for inverted index 206, "0" is a document identifier for the first document, "1" is a document identifier for the second document, and "2" is a document identifier for the third document. As indicated by the example entries above, "Sony" is present in the first and second documents, "Vaio" is present in the first and third documents, and "Playstation" is present in the second document. Inverted index 206 may include any number of indexed tokens, including thousands, tens of thousands, and even further numbers of indexed tokens. In an embodiment, location information (e.g., page number, column number, line number, word number, etc.) may be provided in inverted index 206 to identify a location of each token in each of the associated identified documents.

Inverted index querier 202 queries inverted index 206 for each entity string of reference list 108. Each query of inverted index 206 generates a list of document identifiers for the entity string. For example, if inverted index querier 202 queries the example of inverted index 206 shown above with "Vaio," a list of document identifiers that includes the first and third documents ({0, 2}) is generated. If the example of inverted index 206 shown above is queried with "Sony Vaio," a list of a single document identifier—a document identifier for the first document ({0}) is returned (because {0} results from a set intersection of the list of document identifiers for "Sony" {0, 1} and "Vaio" {0, 2}).

Thus, inverted index querier 202 generates a list of document identifiers for each entity string of reference list 108. Inverted index querier 202 is configured to perform a set union of the generated list of document identifiers for all of the entity strings to generate a set of document identifiers for all of the entity strings in reference list 108. For instance, if "Vaio" and "Sony Vaio" are the only entity strings in reference list 108, inverted index querier 202 performs a set union of the query results for "Vaio" and "Sony Vaio" (which in the current example are {0, 2} and {0}, respectively), resulting in a set of document identifiers for the first and third documents ({0, 2}). As shown in FIG. 2, inverted index querier 202 outputs the generated set of document identifiers for all of the entity strings as set of document identifiers 208.

As further shown in FIG. 2, document retriever 204 receives set of document identifiers 208. Document retriever 204 is configured to access each document identified in set of documents identifiers 208 in set of documents 110 in a one-by-one fashion. As shown in FIG. 2, document retriever 204 outputs the accessed documents one-by-one as filtered documents 210.

Similarly to system 100 shown in FIG. 1, in FIG. 2, entity recognition module 106 receives filtered documents 210. Entity recognition module 106 is configured to perform entity recognition on filtered documents 210. For example, as described above, entity recognition module 106 may be configured to perform machine learning (ML) and/or natural language processing (NLP) techniques to further filter filtered documents 210, to ensure that entity strings of reference list 108 that are present in filtered documents 210 are actually references to desired entities and are not other uses of the entity strings, such as a generic phrase references.

As shown in FIG. 2, entity recognition module 106 generates extracted information 212. Similarly to extracted information 116 shown in FIG. 1, extracted information 212 may include a set of document identifiers for documents of filtered documents 210 that include entity strings of reference list 108, as determined according to the ML and/or NLP techniques. Furthermore, extracted information 212 may include a list generated by entity recognition module 106 for each identified document of the one or more entity strings included in the identified document.

Similarly to system 100 shown in FIG. 1, system 100 may be used in an "ad-hoc" entity extraction scenario, where users can dynamically provide new or updated reference lists 108. In the case of system 200, document filter 214 accesses inverted index 206 in order to process a subset of the documents in set of documents 110, rather than scanning and processing all documents in set of documents 110 as is performed by system 100. Because document filter 214 does not process each document, but instead accesses inverted index 206, system 200 may perform more efficiently than system 100. However, system 200 includes inefficiencies. For instance, in many scenarios, there are tokens and/or token combinations that may shared by multiple entity strings in reference list 108. Examples of such tokens are those that are generated to handle approximate matches, and/or those included in overlapping token combinations.

For example, the token "Sony" and the token combination "Sony Vaio" are included in entity strings "Sony Vaio FS740" and "Sony Vaio VX88P." With regard to an approximate match, an entity string such as "Sony Vaio FS740" may have variants, such as "Vaio FS740" and "Sony FS740," which share one or more tokens with "Sony Vaio FS740." All three entity strings may be present in reference list 108. The inclusion of approximately matching entity strings and/or overlapping entity strings in reference list 108 may result in inefficient processing by filter 214. The approximately matching entity strings and/or overlapping entity strings present in reference list 108 may result in some documents being identified in inverted index 206 multiple times by queries issued by inverted index querier 202. Such redundant processing due to intersecting document lists of entity strings can result in a waste of processing time and resources.

Embodiments of the present invention enable more efficient filtering of documents for entity extraction. Example embodiments are described as follows.

Example Embodiments

Embodiments provide techniques for filtering documents that may be used entity extraction. In an embodiment, a covering set of token sets is identified for reference list 108 to enable more efficient querying of inverted index 206. The covering set of token sets may enable a reduction in a number of queries in exchange for additional documents being processed by an entity string matcher. The covering set of token sets may be selected in a manner to balance the costs of inverted index querying and entity string matching to provide an efficient document filter.

Figure 4:
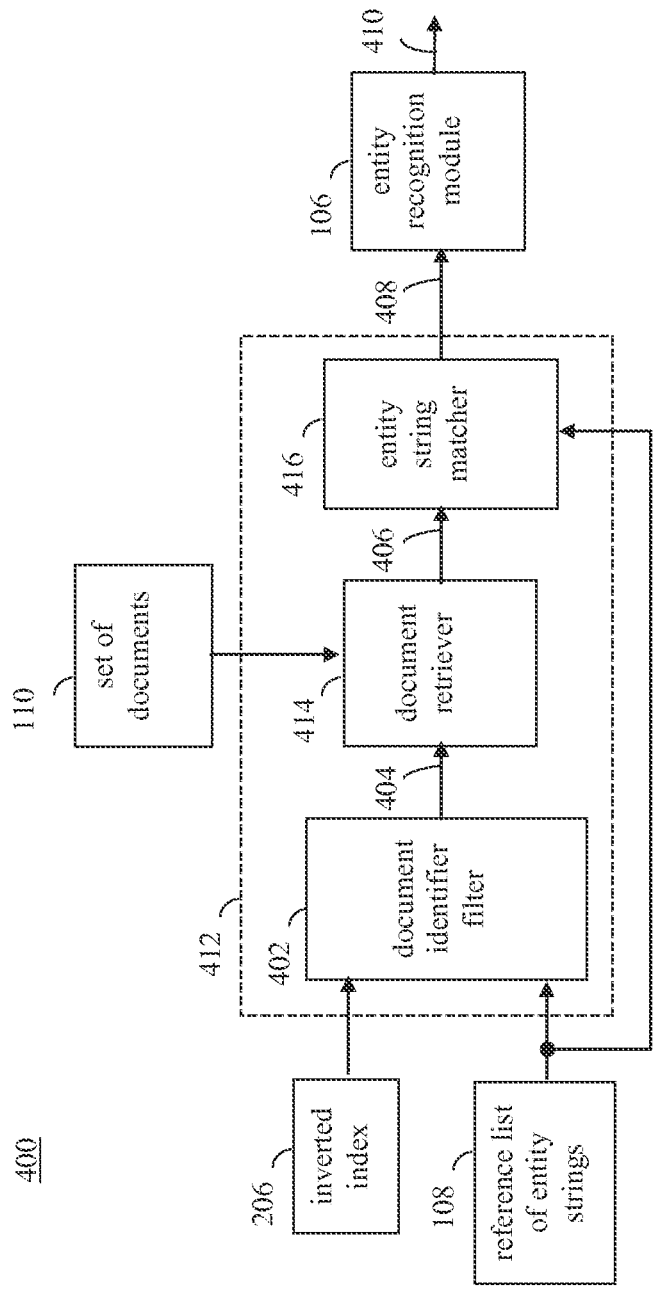
FIG. 4 shows a block diagram of an entity extraction system, according to an example embodiment.

For example, FIG. 4 shows a block diagram of an entity extraction system 400, according to an example embodiment. System 400 is configured to perform entity extraction on set of documents 110 based on reference list 108. As shown in FIG. 4, system 400 includes a document filter 412 and entity recognition module 106. Document filter 412 is configured to filter documents of set of documents 110 to reduce a number of documents that are processed by entity recognition module 106. As shown in FIG. 4, document filter 412 includes a document identifier filter 402, a document retriever 414, and an entity string matcher 416.

Figure 5:
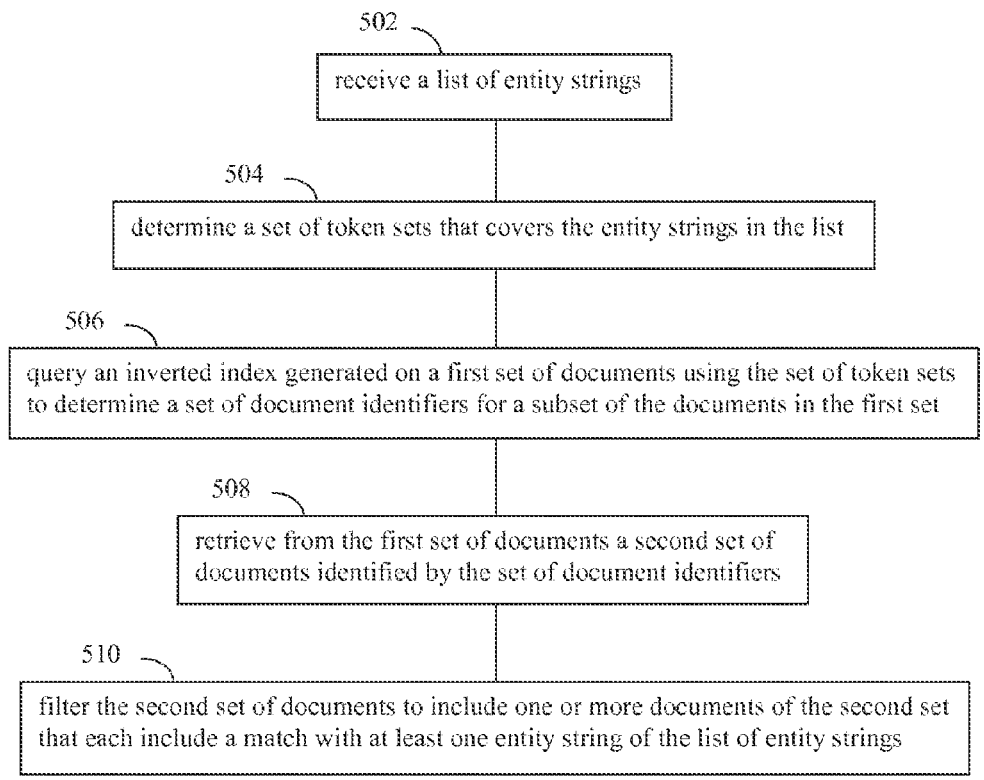
FIG. 5 shows a flowchart for filtering a set of documents, according to an example embodiment.

System 400 is described as follows with respect to FIG. 5. FIG. 5 shows a flowchart 500 for filtering a set of documents, according to an example embodiment. Flowchart 500 may be performed by document filter 412 in FIG. 4. Other structural and operational embodiments will be apparent to persons skilled in the relevant art(s) based on the discussion regarding flowchart 500. Flowchart 500 is described as follows.

In step 502, a list of entity strings is received. For example, as shown in FIG. 4, reference list 108 may be received by document identifier filter 402. As described above, reference list 108 may list any number of entity strings, including tens, hundreds, thousands, and even larger numbers of entity strings. Reference list 108 may be generated by, and received from a user, such as a person performing research on one or more topics. The user may include in reference list 108 any number of entity strings in which the user is interested.

Figure 6:
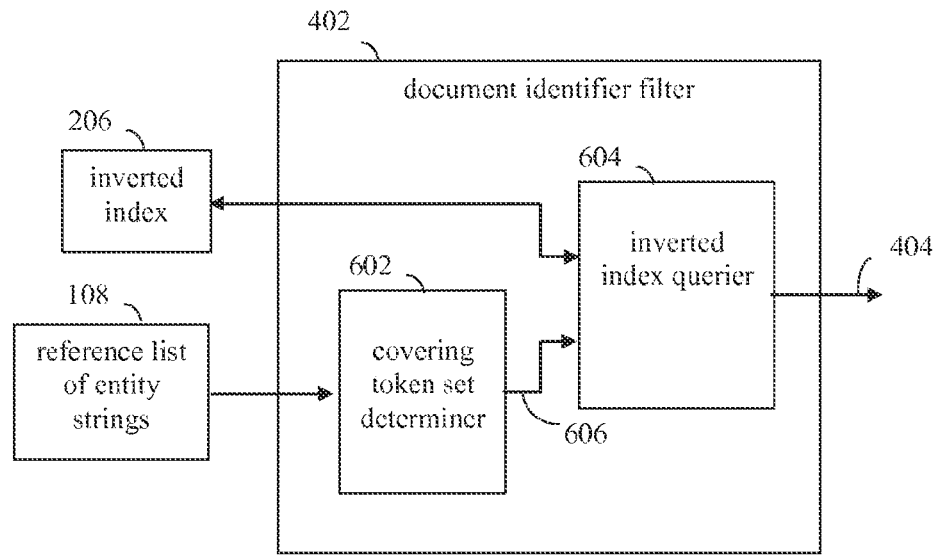
FIG. 6 shows a block diagram of a document identifier filter, according to an example embodiment.

In step 504, a set of token sets that covers the entity strings in the list is determined. FIG. 6 shows a block diagram of document identifier filter 402, according to an example embodiment. As shown in FIG. 6, document identifier filter 402 includes a covering token set determiner 602 and an inverted index querier 604. In an embodiment, covering token set determiner 602 may perform step 504. The covering token set determiner 602 is configured to generate a set of token sets that covers the entity strings in reference list 108. A set of token sets that covers the entity strings in reference list 108 is a set of token sets that when used to query inverted index 206 results in all of the document identifiers being returned that would have been returned if all of the entity strings in reference list 108 were used to query inverted index 206, and may further result in additional document identifiers being returned that would not have been returned when all of the entity strings in reference list 108 are used to query inverted index 206.

For example, reference list 108 may include the following example entity strings (repeated from above):

Sony Vaio FS740
Sony Vaio VX88P
Sony Playstation 3
XBox 360 Core System
XBox 360 Wireless Controller If these entity strings are used to query inverted index 206, inverted index 206 returns document identifiers for a set of documents that includes these entity strings. According to an embodiment, covering token set determiner 602 may determine a covering set of token sets for these entity strings. When used to query inverted index 206, the covering set of token sets will return the document identifiers for the set of documents that include these entity strings, and may include further document identifiers. A variety of covering sets of tokens sets may be determined according to step 504.

For example, a first example covering set of token sets for the entity strings shown above is shown as follows:

---
{"Sony", "Vaio"}
{"Playstation"}
{"Xbox"}
---

In this first example covering set of token sets, the covering token set {"Sony", "Vaio"} covers "Sony Vaio FS740" and "Sony Vaio VX88P." This is because if "Sony Vaio" is used to query inverted index 206, the set of document identifiers that is returned will include all the document identifiers that would be returned if "Sony Vaio FS740" and "Sony Vaio VX88P" were each used to query inverted index 206, and may include further document identifiers. A query of inverted index 206 using "Sony Vaio FS740" would return document identifiers for all documents of set of documents 110 that include the entity string "Sony Vaio FS740." Likewise, a query of inverted index 206 using "Sony Vaio VX88P" would return document identifiers for all documents of set of documents 110 that include the entity string "Sony Vaio VX88P." However, a query of inverted index 206 using covering token set {"Sony", "Vaio"} would return document identifiers for all documents of set of documents 110 that include either or both of the entity strings "Sony Vaio FS740" and "Sony Vaio VX88P," in addition to document identifiers for documents that merely include the token set {"Sony", "Vaio"}.

In a similar fashion, the above-listed covering tokenset {"Playstation"} covers "Sony Playstation 3." If "Playstation" is used to query inverted index 206, the set of document identifiers that is returned will include all the document identifiers that would be returned if "Sony Playstation 3" was used to query inverted index 206, and may include further document identifiers. The covering tokenset {"Xbox"} covers "XBox 360 Core System" and "XBox 360 Wireless Controller." If "Xbox" is used to query inverted index 206, the set of document identifiers that is returned will include all the document identifiers that would be returned if "XBox 360 Core System" and "XBox 360 Wireless Controller" were each used to query inverted index 206, and may include further document identifiers. In this manner, the covering set of three token sets {"Sony", "Vaio"}, {"Playstation"}, and {"Xbox"} covers the five entity strings shown in the above example of reference list 108.

A second example of covering set of token sets for the entity strings shown above is shown as follows:

---
("Vaio"}
("Playstation"}
("Xbox"}
---

In this second example covering set of token sets, the covering token set {"Vaio"} covers "Sony Vaio FS740" and "Sony Vaio VX88P," the covering token set "Playstation" covers "Sony Playstation 3," and the covering token set {"Xbox"} covers "XBox 360 Core System" and "XBox 360 Wireless Controller." In this manner, the covering set of three token sets {"Vaio"}, {"Playstation"}, and {"Xbox"} covers the five entity strings shown in the above example of reference list 108. If "Vaio," "Playstation," and "Xbox" are issued in queries to inverted index 206, all documents identifiers that would be returned from queries to inverted index 206 using the above listed five entity strings would be returned, and some additional documents identifiers may be returned (e.g., for documents that include the token set {"Vaio"} but not all of "Sony Vaio VX88P," etc.).

Various further covering set of token sets may be generated by covering token set determiner 602 to cover the example of reference list 108 shown above, including a third example covering set of token sets of {"Sony"} and {"Xbox"}, a fourth example covering set of token sets of {"Sony", "Vaio"}, {"Playstation"}, and {"360"}, and further covering sets of token sets. In an embodiment, covering token set determiner 602 may be configured to generate the covering set of token sets in a manner that minimizes the number of tokens in the covering set of token sets, to minimize a processing cost for document filter 412, and/or in other ways. Examples of determining covering set of token sets for the entity strings in reference list 108 are described further below. As shown in FIG. 6, covering token set determiner 602 outputs the determined covering set of token sets as covering set of token sets 606.

Referring back to FIG. 5, in step 506 of flowchart 500, an inverted index generated on a first set of documents is queried using the set of token sets to determine a set of document identifiers for a subset of the documents in the first set. As described above with respect to FIG. 3, inverted index 206 is generated on set of documents 112. In an embodiment, inverted index querier 604 may query inverted index 206 using covering set of token sets 606 to determine a set of document identifiers.

Inverted index querier 604 queries inverted index 206 with each entry in covering set of token sets 606. Each entry in covering set of token sets 606 may be a single token (e.g., {"Sony"}), a token pair (e.g., {"Sony", "Vaio"}), a token triplet (e.g., {"Sony", "Vaio", "VX88P"}), or a larger set of tokens. Each query of inverted index 206 that includes one or more entries of covering set of token sets 606 generates a list of document identifiers for the one or more entries. For example, if inverted index querier 604 queries the example of inverted index 206 provided above with "Vaio," a list of document identifiers that includes the first and third documents ({0, 2}) is generated. If the example of inverted index 206 provided above is queried with "Sony Vaio," a list of a single document identifier—a document identifier for the first document ({0})—is returned.

Thus, inverted index querier 604 generates a list of document identifiers for each entry or batch of entries in covering set of token sets 606 used in a query. Inverted index querier 604 is configured to perform a set union of the lists of document identifiers determined for all of the entries or groups of entries in covering set of token sets 606 to generate a set of document identifiers for all of the entries. For instance, if {"Vaio"} and {"Sony", "Vaio"} are the only entries in covering set of token sets 606, inverted index querier 604 performs a set union of the query results for "Vaio" and "Sony Vaio" (which are {0, 2} and {0}, respectively), resulting in a set of document identifiers for the first and third documents ({0, 2}). In example applications, inverted index querier 604 may perform set unions of tens, hundreds, thousands, and even greater numbers of determined lists of document identifiers. As shown in FIG. 6, inverted index querier 604 outputs the generated set of document identifiers for all of the entries in covering set of token sets 606 as set of document identifiers 404.

Note that in an embodiment, step 506 of flowchart 500 may include the step of querying inverted index 206 with a plurality of batch queries. In such an embodiment, each batch query uses a subset of covering set of token sets 606 to query inverted index 206. Batch queries may be used to access inverted index 206 in the case where an inverted index engine that handles queries for inverted index 206 can only handle small numbers of query terms at any one time. If reference list 108 includes large numbers of entity strings (e.g., hundreds, thousands, or more), batch queries may be desirable to use to query inverted index 206.

Figure 7:
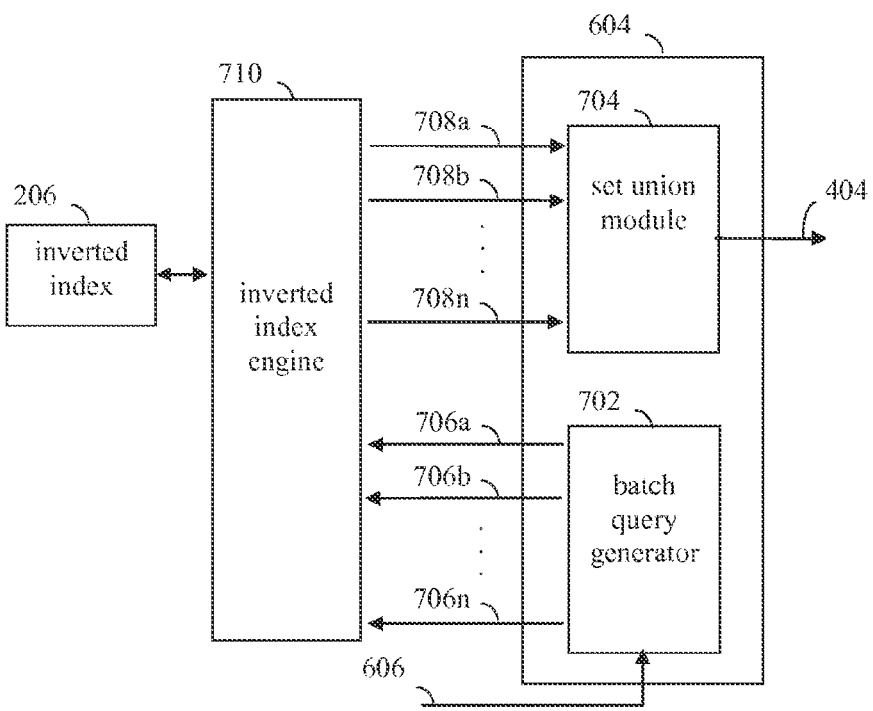
FIG. 7 shows a block diagram of an inverted index querier configured to access an inverted index using batch queries, according to an example embodiment.

For instance, FIG. 7 shows a block diagram of inverted index querier 604 accessing inverted index 206 using batch queries, according to an example embodiment. As shown in FIG. 7, inverted index querier 604 may include a batch query generator 702 and a set union module 704. As shown in FIG. 7, batch query generator 702 receives covering set of token sets 606. Batch query generator 702 may be configured to divide covering set of token sets 606 into a plurality of subsets, with each subset including a number of entries of covering set of token sets 606 that is less than or equal to a maximum allowable batch size. As shown in FIG. 7, batch query generator 702 transmits a plurality of batch queries 706*a*-706*n* (e.g., in series). Any number of batch queries 706 may be generated by batch query generator 702, depending on the size of covering set of token sets 606 and the maximum allowable batch size.

As shown in FIG. 7, batch queries 706*a*-706*n* are received by an inverted index engine 710. Inverted index engine 710 is configured to query inverted index 206 with each received batch query 706. Inverted index engine 710 generates a plurality of batch query responses 708*a*-708*n*, corresponding to batch queries 706*a*-706*n*. Each batch query response 708 may include one or more document identifiers corresponding to the subset of entries of covering set of token sets 606 received in the corresponding batch query 706. A batch query response 708 contains all of the document identifiers identified for all entries in the subset of covering set of token sets 606 received in the corresponding batch query 706.

As shown in FIG. 7, batch query responses 708*a*-708*n* are received by set union module 704. Set union module 704 performs a union of the document identifiers received in all of batch query responses 708*a*-708*n*. Set union module 704 outputs the union of document identifiers as set of document identifiers 404.

Referring back to FIG. 5, in step 508 of flowchart 500, a second set of documents identified by the set of document identifiers is retrieved from the first set of documents. For example in an embodiment, as shown in FIG. 4, document retriever 414 may receive set of document identifiers 404. Document retriever 414 may be configured to access set of documents 110 for each document identified in set of documents identifiers 404 in a one-by-one or multiple-document fashion. Typically, the documents identified in set of document identifiers 404 do not include all of the documents included in set of documents 110. As shown in FIG. 4, document retriever 414 outputs the accessed documents one-by-one or in groups (depending on the particular implementation of document retriever 414) as retrieved documents 406.

In step 510, the second set of documents is filtered to include one or more documents of the second set that each include a match with at least one entity string of the list of entity strings. For example, in an embodiment, as shown in FIG. 4, entity string matcher 416 may receive retrieved documents 406 and reference list 108. In a similar fashion as described above for entity string matcher 104 (FIG. 1), for each document received of retrieved documents 406, entity string matcher 416 determines whether the received document includes one or more entity strings of reference list 108. All tokens of an entity string must be included in a document, and the tokens of the entity string must sequentially appear in the document in the order provided in reference list 108, for entity string matcher 416 to determine that the document includes the entity string. Entity string matcher 416 may be configured in a variety of ways to perform this determination, including being configured to perform standard string matching techniques. As shown in FIG. 4, entity string matcher 416 outputs the documents determined to include one or more of the entity strings of reference list 108 as filtered documents 408.

Note that in an embodiment, flowchart 500 may include the further step of performing entity recognition on the filtered second set of documents. For instance, as described above with respect to FIGS. 1 and 2, entity recognition module 106 may receive filtered documents 408. Entity recognition module 106 is configured to perform entity recognition on filtered documents 408. For example, as described above, entity recognition module 106 may be configured to perform machine learning (ML) and/or natural language processing (NLP) techniques to further filter filtered documents 408, to ensure that entity strings matched in filtered documents 408 are actually references to a desired entity and are not other uses of the entity strings, such as a generic phrase references.

As shown in FIG. 4, entity recognition module 106 generates extracted information 410. Similarly to extracted information 116 shown in FIG. 1 and extracted information 212 shown in FIG. 2, extracted information 410 may include a set of document identifiers for documents of filtered documents 408 that include entity strings of reference list 108, as determined according to the ML and/or NLP techniques. Furthermore, extracted information 410 may include a list generated by entity recognition module 106 for each identified document of the one or more entity strings included in the identified document. Extracted information 410 may be analyzed by a user that provided reference list 108 to system 400 as part of research being performed by the user, for example.

Example Embodiments for Selecting Covering Sets of Token Sets

As described above, covering token set determiner 602 shown in FIG. 6 may be configured to generate a covering set of token sets—covering set of token sets 606—in various ways, including in a manner that minimizes the overall cost for document filter 412 (shown in FIG. 4). For example, FIG. 8 shows a step 802 that may be performed during step 504 of flowchart 500 (FIG. 5), according to an example embodiment. In step 802, a set of token sets is selected that minimizes a sum of a first cost associated with step 506 and a second cost associated with step 508 and step 510. Accordingly, in an embodiment, covering token set determiner 602 may be configured to select covering set of token sets 606 in a manner that minimizes a sum of a first cost associated with performance of batch queries by document identifier filter 412 (FIG. 4) and a second cost associated with retrieving the documents identified in set of document identifiers 404 by document retriever 414 and with filtering retrieved documents 406 by entity string matcher 416.

In an example embodiment, the first cost may be defined according to Equation 1 shown as follows:

$$C_{idx}\left(\sum_{i=1}^{K}\sum_{t\in Tokens(T_i)}|D(t)|\right)+C_{ini}\left\lceil\frac{K}{B}\right\rceil \quad \text{Equation 1}$$

where $T_i$=an ith token set in the covering set of token sets 606,

Tokens($T_i$)=the one or more tokens in $T_i$,

D(t)=a number of document identifiers determined for a token t,

K=a number of entries in covering set of token sets 606,

B=a maximum allowable number of entries for each subset of covering set of token sets 606 for querying against the inverted index, $C_{idx}$=a predetermined estimated cost associated with each document identifier determined for each entry of covering set of token sets 606 during the batch queries, and $C_{ini}$=a predetermined estimated initialization cost associated with each batch query.

The first cost term of Equation 1 models a cost for querying inverted index 206 based on a quantity of document identifiers determined from inverted index 206 for the entries of covering set of token sets 606. The inner summation of the first cost term of Equation 1 sums a number of document identifiers for all the tokens in a single token set in the covering set of token sets 606. The outer summation of the first cost term of Equation 1 sums inner summations determined for all of the token sets, to generate a total sum of document identifiers determined for all token sets of covering set of token sets 606. The constant term $C_{idx}$ models a cost per document identifier for performing the batch queries, and thus is multiplied by the generated total sum to generate a total cost associated with querying inverted index 206. The constant term $C_{idx}$ may be determined in any suitable manner, including by calibration experiments.

The second cost term of Equation 1 models a cost for initializing the batch queries. The number of entries (K) in covering set of token sets 606 is divided by the maximum allowable number of entries (B) for each subset of covering set of token sets 606, and is rounded up to the nearest integer, to estimate a number of batch queries performed. The constant term $C_{ini}$ models an initialization cost associated with each batch query. The estimated number of batch queries is multiplied by constant term $C_{ini}$ to generate a total cost associated with initializing the batch queries. The first and second cost terms of Equation 1 are summed to generate an estimated cost associated with performing the batch queries.

In an example embodiment, the second cost may be defined according to Equation 2 shown as follows:

$$C_{doc}\sum_{i}|D(T_i)| \quad \text{Equation 2}$$

where $D(T_i)$=a number of document identifiers determined for the ith token set of covering set of token sets 606 used for batch query i, and $C_{doc}$=a predetermined estimated cost for each document in retrieved documents 406 associated with retrieving documents by document retriever 414 and for filtering retrieved documents 406 by entity string matcher 416.

The cost term of Equation 2 models a cost for retrieving and filtering retrieved documents 406. The summation of Equation 2 sums all the document identifiers in inverted index 206 identified by the batch queries. The constant term $C_{doc}$ models an average cost for of retrieving each identified document with document retriever 414 and for processing each identified document with entity string matcher 416. For example, the cost for processing each identified document with entity string matcher 416 may be based on entity string matcher 416 applying the Aho-Corasick algorithm to detect all phrases in identified documents corresponding to entity strings in reference list 108. The determined sum of document identifiers is multiplied by constant term $C_{doc}$ to generate a total cost associated with the retrieving and filtering.

Note that Equations 1 and 2 shown and described above provided example ways of defining the first and second costs recited in step 802 in FIG. 8, and are not intended to be limiting. Further techniques for defining such costs may be identified by persons skilled in the relevant art(s).

Note that in step 802, the sum of the first and second costs may be minimized in various ways by selection of covering set of token sets 606. For example, in an embodiment, covering token set determiner 602 may be configured to minimize the sum by selecting covering set of token sets 606 according to a greedy heuristic.

For instance, FIG. 9 shows a flowchart 900 for performing a greedy heuristic to select a covering set of token sets 606 to minimize document filtering costs, according to an example embodiment. Flowchart 900 may be performed by covering token set determiner 602, for example. Other structural and operational embodiments will be apparent to persons skilled in the relevant art(s) based on the discussion regarding flowchart 900. Flowchart 900 is described as follows.

In step 902, the covering set of token sets is initialized. The covering set of token sets may be initialized in any suitable manner. In an embodiment, the covering set of token sets is initialized to an empty set.

In step 904, a set of candidate token sets is generated. A set of candidate token sets may be generated in any manner. In an embodiment, a set of candidate token sets may be formed to include all subsets of tokens occurring in one or more entity strings of reference list 108. In an embodiment, each candidate token set may be further restricted to including at most m tokens. In an embodiment, a value of m=3 can be used.

In step 906, an initial benefit is calculated for each candidate token set in the set of candidate token sets for inclusion in the covering set of token sets. A benefit in including each candidate token set in the covering set of token sets is calculated for each candidate token set generated in step 904. The benefit may be calculated in any suitable manner. For example, a benefit for including each candidate token set in the covering set of token sets may be determined based on a resulting reduction in the sum of the first and second costs described above compared to a full DNF formula. For example, in an embodiment, Equation 3 shown as follows may be used to calculate a cost reduction for each candidate token set resulting from including the candidate token set in the covering set of token sets:

$$C_{idx}\left(\sum_{e\in E_i(T)}\sum_{t\in Tokens(e)}|D(t)|-\sum_{t\in Tokens(T)}|D(t)|\right)+ \quad \text{Equation 3}$$

-continued $$C_{ini}\left(\frac{|E_i(T)|-1}{B}\right) - C_{doc}\left(|D(t)| - \left|\bigcup_{e \in E_i(T)} D(e)\right|\right)$$

where e=an entity string of reference list 108,

Tokens(e)=the set of tokens in entity string e, $E_i(T)$=a set of entity strings covered by token subset T, but not covered by any candidate token set already included in the covering set of token sets (an uncovered set of tokens) at any stage of the algorithm, and D(e)=a number of document identifiers determined for entity string e, The first term and second terms of Equation 3 relates to Equation 1 shown above, providing a cost reduction with respect to querying inverted index 206 (step 506 of flowchart 500). The third term of Equation 3 relates to Equation 2 shown above, providing a cost reduction with respect to retrieving and filtering retrieved documents 406 (steps 508 and 510 of flowchart 500).

In step 908, a candidate token set in the set of candidate token sets having the greatest calculated initial benefit is included in the covering set of token sets. In an embodiment, the candidate token sets generated in step 904 may be ordered in a priority queue according to their respective initial benefits calculated in step 906. A candidate having a highest calculated initial benefit is first in the priority queue, and is the first candidate token set selected to be included in the covering set of token sets.

In step 910, any token set included in the covering set of token sets affected by step 908 is updated. Any candidate token sets already present in the covering set of token sets (according to prior iterations of step 908) may have their respective entity string coverages affected by including the candidate token set of the current iteration of step 908. Already-present candidate token sets having affected coverages may be those that already cover one or more entity strings that are covered by the currently added candidate token set. $E_i(T)$ can be determined by intersecting the uncovered set of tokens with E(T). At initialization time, a hash table may be generated that associates each entity string with its covering token sets. Based on Equation 3, for any entity string $e \in E_i(T)$, we reduce the benefit of $T \in \text{TokenSet}(e)$ by Equation 4 shown as follows:

$$|D(e)| \cdot C_{doc} + \left(\sum_{t \in e} D(t)\right) \cdot C_{idx} + \frac{C_{ini}}{B} \qquad \text{Equation 3}$$

Note that if a token set covers multiple entity strings in $E_i(T)$, the above reduction will occur multiple times, once for each entity string covered.

Lazy Updates: "Lazy updates" of benefits of impacted token sets may be performed as follows. Instead of updating all impacted token sets in the priority queue, all impacted token sets are added to a "LazyUpdates" hash table. Whenever a token set with the highest benefit is selected from the priority queue, the hash table may be checked for the presence of the token set. If the token set is present in the hash table, the benefit of the token set may be updated, the token set may be inserted into the priority queue, and the token set may be again selected from the priority queue. Because many impacted token sets may never surface to the top of the priority queue, a significant number of unnecessary benefit updates may be avoided.

In step 912, steps 908 and 910 are iterated. Steps 908 and 910 may be iterated as many times as desired, selecting a next candidate token set in step 908, and updating affected token sets accordingly, until a covering set of token sets is generated that suitably minimizes the sum of the first and second costs and all entity strings of reference list 108 are covered by the covering set of token sets, which may be output as covering set of token sets 606.

Example pseudocode for performing the greedy heuristic to select a covering set of token sets 606 to minimize document filtering costs is shown as follows:

```
GreedyEntityCover (E, Tcands)
00  Build priority queue PQ over Tcands by benefit
01  UnCovered = TokenSets(E), Covered = { }
        EC = { }, LazyUpdates = { }
02  while (Uncovered not empty)
03      if (PQ is empty) break;
04      else T ← PQ.pop( )
05      while (T ∈ LazyUpdates)
06          Remove T from LazyUpdates
07          Update Benefit(T) and push T in PQ
08          T ← PQ.pop( )
09      EC = EC ∪ {T}
10      Add token sets covering any entity in
            E(T) - Covered to LazyUpdates
11      Uncovered = Uncovered - E(T)
12      Covered = Covered ∪ E(T)
13  return (EC, Phrase queries for uncovered entities)
```

The above provided pseudocode is provided for illustrative purposes, and is not intended to be limiting. Embodiments may be implemented according other software/firmware algorithms and/or in hardware, as would be known to persons skilled in the relevant art(s) from the teachings herein.

Example Approximate Match Embodiments

In the embodiments described in the previous sections, documents are identified that contain text exactly matching one or more entity string in reference list 108. In further embodiments, documents may be identified containing text that "approximately" matches one or more entity strings in reference list 108.

For example, a product listed in reference list 108, such as "Microsoft Xbox 360 4 GB system," may be mentioned in a document of set of documents 110 under a different representation—an "approximate match" or "approximate mention"—such as "Microsoft Xbox 4 GB" or "Xbox 360 4 GB." In an embodiment where document filter 412 of FIG. 4 is configured to determine exact matches for entity strings of reference list 108, these approximate matches may not be detected. In some cases, it may be desired to determine such approximate matches in order to improve the accuracy of entity recognition performed by entity recognition module 106.

Figure 10:
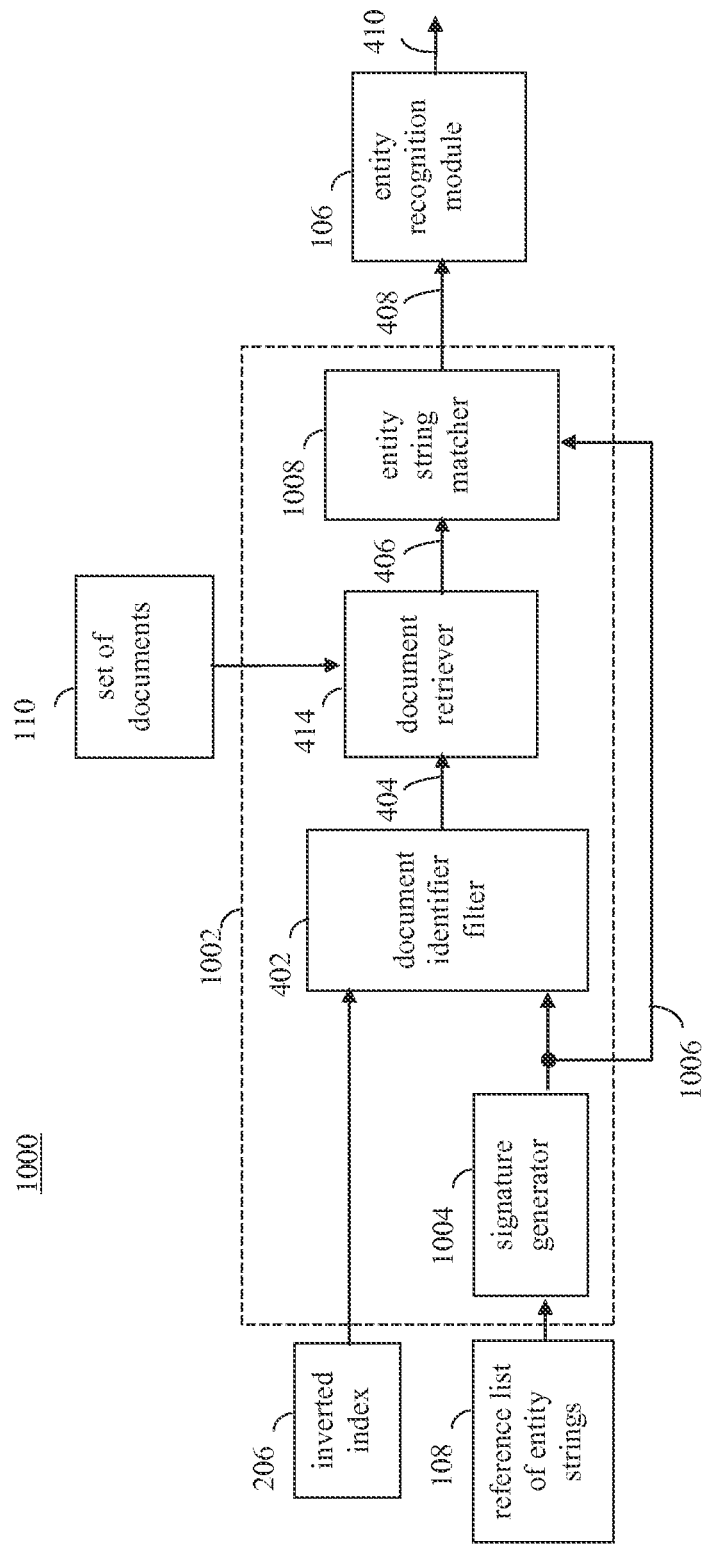
FIG. 10 shows a block diagram of an entity extraction system, according to an example embodiment.

FIG. 10 shows a block diagram of an entity extraction system 1000, according to an example embodiment. System 1000 is generally similar to system 400 shown in FIG. 4, with differences described as follows. As shown in FIG. 10, system 1000 includes a document filter 1002 that is generally similar to document filter 412 of system 400, with the addition of a signature generator 1004. As shown in FIG. 10, signature generator 1004 receives reference list 108. Signature generator 1004 is configured to process reference list 108 to generate a set of signatures 1006. Set of signatures 1006 is a set of entity strings/token sets that includes a set of signatures corresponding to each entity string in reference list 108. The signatures in the set of signatures 1006 for a particular entity string in reference list 108 is a "broader"

version of the entity string. For example, a signature of an entity string may contain fewer tokens than the corresponding entity string.

As shown in FIG. 10, document identifier filter 402 receives set of signatures 1006 (rather than reference list 108). Document identifier filter 402 is configured to perform generally the same as described above, except that set of signatures 1006 is used rather than reference list 108. For example, document identifier filter 402 shown in FIG. 10 may perform step 504 of flowchart 500 (FIG. 5) in a modified manner, to determine a set of token sets that covers the strings in the set of signatures 1006. Furthermore, as shown in FIG. 10, system 1000 includes an entity string matcher 1008 (rather than entity string matcher 416 shown in FIG. 4). Entity string matcher 1008 receives set of signatures 1006 (rather than reference list 108). String matcher 1008 is configured to identify documents in retrieved documents 406 that contain substrings which have substantial overlap of tokens with one or more entity strings. Techniques for string matcher 1008 to perform its functions will be known to persons skilled in the relevant art(s).

Set of signatures 1006 may be generated by signature generator 1004 in a variety of ways. For example, for each entity string in reference list 108, signature generator 1004 may be configured to determine one or more tokens that are key token(s) relative to the identity of the entity string. For instance, a signature of "FS740" may be determined for the entity string "Sony Vaio FS740." Any document of set of documents 110 containing the token "FS740" may contain information relevant to the original entity string "Sony Vaio FS740," and thus may be desirable to obtain. By using the signature "FS740" such documents may be obtained by system 1000. The use of "Sony" as a signature for "Sony Vaio FS740" may not be as desirable, because "Sony" is a token that is not key to identifying "Sony Vaio FS740," and may lead to obtaining too many undesirable documents.

Some further example entity strings of reference list 108 and corresponding example signatures are shown in Table 1 below:

TABLE 1

| entity strings | signatures |
| --- | --- |
| Sony Vaio VX88P | {Vaio, VX88P}, {Sony, VX88P} |
| Sony Playstation 3 | {Sony, Playstation, 3} |
| Microsoft Xbox 360 Core System | {Xbox, 360} |
| Microsoft Xbox 360 Wireless Controller | {Xbox, Wireless, Controller} |

Signatures may be selected for entity strings in a variety of ways, including using human selection and/or by automated techniques. For example, product codes (e.g., VS88P) may be selected from entity strings (for entity strings related to products) to be signatures. String similarity functions, such as Jaccard similarity (e.g., the Jaccard index), edit distance, and/or further functions, may be used to identify substrings in documents that are approximate mentions of entity strings in the reference set. Further techniques may be used, as would be known to persons skilled in the relevant art(s).

Example Bulk Union Embodiments

As described above, some inverted index engines (e.g., inverted index engine 710 in FIG. 7) handles queries with a small number of tokens. However, reference list 108 may include a large number of entity strings for processing. As described above, such queries can be batched to be executed by inverted index engine 710. However, some of inverted index engines, such as SQL Server 2008, expose a relational view of the inverted index. For instance, the relational view over the inverted index may be [Token; DocId; Pos]. Using this view, a union of docid sets of a large number of tokens can be performed. For example, the following SQL query performs a union of docid lists of a set of tokens in a TokenTable[Token].

```
SELECT distinct R.DocId
FROM II-RelationalView R, TokenTable S
WHERE R:Token = S:Token
```

The union operation over a large number of document lists can be performed efficiently based on well-known techniques such as hash-union or merge-sort techniques. The hash-union operation maintains a hash table of document identifiers; each identifier in a document list is added to the hash table if it does not exist already. The merge-sort operation sorts each document list in the docId order and merges the document lists.

Example Embodiments

In an embodiment, a method for filtering a set of documents includes: receiving a list of entity strings; determining a set of token sets that covers the entity strings in the list; querying an inverted index generated on a first set of documents using the set of token sets to determine a set of document identifiers for a subset of the documents in the first set; retrieving from the first set of documents a second set of documents identified by the set of document identifiers; and filtering the second set of documents to include one or more documents of the second set that each include a match with at least one entity string of the list of entity strings.

The method may further include performing entity recognition on the filtered second set of documents.

The querying may include querying the inverted index with a plurality of batch queries, each batch query using a subset of the set of token sets to query the inverted index.

The determining a set of token sets that covers the entity strings in the list may include selecting the set of token sets that minimizes a sum of a first cost associated with said querying and a second cost associated with said retrieving and said filtering.

The selecting may include defining the first cost according to $$C_{idx} = \left( \sum_{i=1}^{K} \sum_{t \in Tokens(T_i)} |D(t)| \right) + C_{ini}\left\lceil \frac{K}{B} \right\rceil,$$

wherein
$T_i$=an ith token set the set of token sets,
Tokens(Ti)=a set of tokens in $T_i$,
D(t)=a number of document identifiers determined for a token t,
K=a number of entries in the set of tokens,
B=a maximum number of allowable token sets for querying the inverted index,
$C_{idx}$=a cost associated with each document identifier determined for each entry of the set of tokens during the querying, and
$C_{ini}$=an initialization cost associated with each batch query; and defining the second cost according to $$C_{doc} \sum_{i} |D(T_i)|,$$

wherein

D(T$_i$)=a number of document identifiers determined for the ith token set, and

C$_{doc}$=a cost for each document of the second set associated with the retrieving and the filtering.

The selecting may further include minimizing the sum according to a greedy heuristic.

The minimizing may include initializing the covering set of token sets; generating a set of candidate token sets; calculating an initial benefit for each candidate token set in the set of candidate token sets for inclusion in the covering set of token sets; including in the covering set of token sets a candidate token set in the set of candidate token sets having the greatest calculated initial benefit; updating any candidate token sets included in the covering set of token sets affected by said including; and iterating said including and updating.

The determining a set of token sets that covers the entity strings in the list may include: generating a set of signature strings for the entity strings in the list, and determining a set of token sets that cover the signature strings; wherein said querying includes querying the inverted index using the set of token sets that cover the signature strings to determine the set of document identifiers for a subset of the documents in the first set; and wherein said filtering includes filtering the second set of documents to include one or more documents of the second set that each include an approximate mention of at least one entity string of the list of entity strings.

In another embodiment, a system for filtering a set of documents includes: a document identifier filter that includes a covering token set determiner and an inverted index querier, wherein the covering token set determiner is configured to receive a list of entity strings and to determine a set of token sets that covers the entity strings in the list, and the inverted index querier is configured to query an inverted index generated on a first set of documents using the set of token sets to determine a set of document identifiers for a subset of the documents in the first set; a document retriever configured to retrieve from the first set of documents a second set of documents identified by the set of document identifiers; and an entity string matcher configured to filter the second set of documents to include one or more documents of the second set that each include a match with at least one entity string of the list of entity strings.

The system may further include an entity recognition module configured to perform entity recognition on the filtered second set of documents.

The inverted index querier may be configured to query the inverted index with a plurality of batch queries, with each batch query using a subset of the set of token sets to query the inverted index.

The covering token set determiner may be configured to select the set of token sets that minimizes a sum of a first cost associated with the document identifier filter performing the batch queries and a second cost associated with the document retriever retrieving the second set of documents and with the entity string matcher filtering the second set of documents.

The first cost may be defined as $$C_{idx}\left(\sum_{i=1}^{K}\sum_{t \in Tokens(T_i)} |D(t)|\right) + C_{ini}\left\lceil\frac{K}{B}\right\rceil,$$

wherein

T$_i$=an ith token set the set of token sets,

Tokens (Ti)=a set of tokens in T$_i$,

D(t)=a number of document identifiers determined for a token t,

K=a number of entries in the set of tokens,

B=a maximum number of allowable token sets for querying the inverted index,

C$_{idx}$=a cost associated with each document identifier determined for each entry of the set of tokens during said querying, and C$_{ini}$=an initialization cost associated with each batch query; and wherein the second cost is defined as $$C_{doc}\sum_{i} |D(T_i)|,$$

wherein

D(T$_i$)=a number of document identifiers determined for the ith token set, and

C$_{doc}$=a cost for each document of the second set associated with said retrieving and said filtering.

The covering token set determiner may be configured to minimize the sum according to a greedy heuristic.

The covering token set determiner may be configured to initialize the covering set of token sets, to generate a set of candidate token sets, to calculate an initial benefit for each candidate token set in the set of candidate token sets for inclusion in the covering set of token sets, to include in the covering set of token sets a candidate token set in the set of candidate token sets having the greatest calculated initial benefit, and to update any candidate token sets included in the covering set of token sets affected by inclusion of the candidate token set in the covering set of token sets.

The system may further include a signature generator configured to generate a set of signatures for the entity strings in the list.

Example Implementations

Note that any one or more of document filter 412 shown in FIG. 4, including document identifier filter 402, document retriever 414, and entity string matcher 416, entity recognition module 106 shown in FIG. 4, covering token set determiner 602 shown in FIG. 6, inverted index querier 604 shown in FIG. 6, batch query generator 702 shown in FIG. 7, and set union module 704 shown in FIG. 7 may include hardware, software, firmware, or any combination thereof to perform at least a portion of their functions. For example, any one or more of document filter 412, document identifier filter 402, document retriever 414, and entity string matcher 416, entity recognition module 106, covering token set determiner 602, inverted index querier 604, batch query generator 702, and set union module 704 may include computer code configured to be executed in one or more processors. Alternatively, any one or more of document filter 412, document identifier filter 402, document retriever 414, and entity string matcher 416, entity recognition module 106, covering token set determiner 602, inverted index querier 604, batch query generator 702, and set union module 704 may include hardware logic/electrical circuitry.

In an embodiment, document filter 412, document identifier filter 402, document retriever 414, and entity string matcher 416, entity recognition module 106, covering token set determiner 602, inverted index querier 604, batch query generator 702, and set union module 704 may be partially or entirely implemented in one or more computers, including a personal computer, a mobile computer (e.g., a laptop computer, a notebook computer, a handheld computer such as a personal digital assistant (PDA) or a Palm™ device, etc.), or a workstation. These example devices are provided herein purposes of illustration, and are not intended to be limiting. Embodiments may be implemented in further types of devices, as would be known to persons skilled in the relevant art(s).

Figure 11:
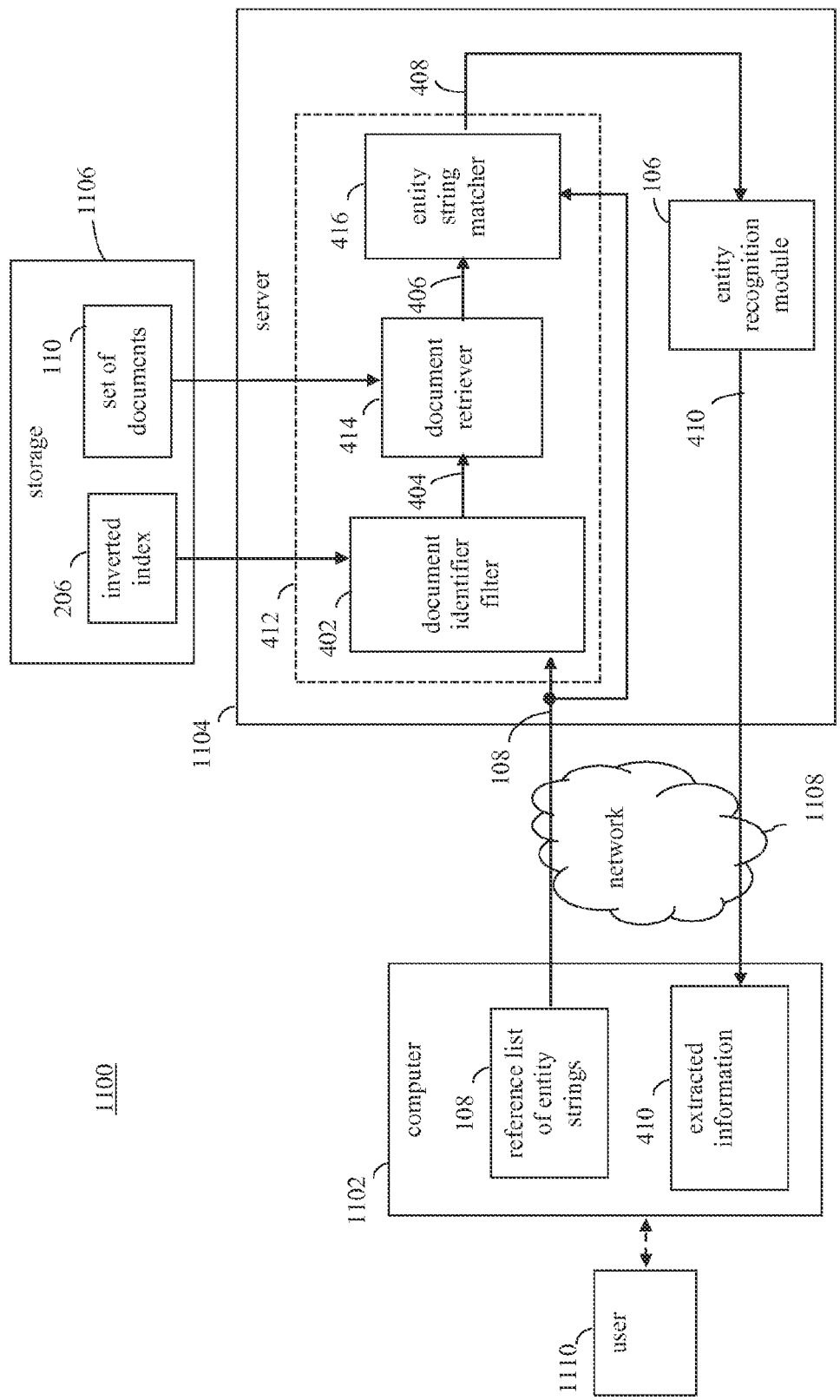
FIG. 11 shows a block diagram of a communication system in which an example document filter embodiment may be implemented.

For instance, FIG. 11 shows a block diagram of a communication system 1100 in which an embodiment may be implemented. Communication system 1100 includes a computer-based implementation of document filter 412 shown in FIG. 4. As shown in FIG. 11, communication system 1100 includes a computer 1102, a server 1104, storage 1106, and a network 1108. In the example of FIG. 11, document filter 412 and entity recognition module 106 are shown implemented in server 1104. Inverted index 206 and set of documents 110 are stored in storage 1106. Storage 1106 is coupled to server 1104. A user 1110 interacts with computer 1102 to perform entity extraction at server 1104. As shown in FIG. 11, user 1110 may generate reference list 108 at computer 1102. For example, user 1110 may be performing research on a particular subject, and lists entity strings related to the research in reference list 108. Computer 1102 transmits a first communication signal through network 1108 to server 1104, which includes reference list 108. Server 1104 receives the first communication signal, and document filter 412 receives reference list 108 from the first communication signal. Document filter 412 processes reference list 108 as described above, accessing inverted index 206 (directly or indirectly through an inverted index engine) and set of documents 110 in storage 1106 as needed, to generate filtered documents 408. Entity recognition module 106 in server 1104 processes filtered documents 408, and generates extracted information 410. Server 1104 transmits a second communication signal through network 1108 to computer 1102, which includes extracted information 410. User 1110 may interact with extracted information 410 as part of the research being performed by user 1110. Furthermore, user 1110 may access documents of set of documents 110 identified by document identifiers in extracted information 410 through network 1108 as desired.

FIG. 11 is provided for purposes of illustration, and is not intended to be limiting. In an example alternative embodiment, user 1110 may access document filter 412 directly (e.g., at server 1104), rather than through network 1108. Network 1108 may be any type of communications network, such as a local area network (LAN), wide area network (WAN), or combination of networks, such as the Internet.

Devices in which embodiments may be implemented (e.g., computer 1102, server 1104) may include storage (e.g., storage 1106), such as storage drives, memory devices, and further types of computer-readable media. Examples of such computer-readable media include a hard disk, a removable magnetic disk, a removable optical disk, flash memory cards, digital video disks, random access memories (RAMs), read only memories (ROM), and the like. As used herein, the terms "computer program medium" and "computer-readable medium" are used to generally refer to the hard disk associated with a hard disk drive, a removable magnetic disk, a removable optical disk (e.g., CDROMs, DVDs, etc.), zip disks, tapes, magnetic storage devices, MEMS (micro-electromechanical systems) storage, nanotechnology-based storage devices, as well as other media such as flash memory cards, digital video discs, RAM devices, ROM devices, and the like. Such computer-readable media may store program modules that include logic for implementing document filter 412, document identifier filter 402, document retriever 414, and entity string matcher 416, entity recognition module 106, covering token set determiner 602, inverted index querier 604, batch query generator 702, and set union module 704, flowchart 500 (FIG. 5), step 802 (FIG. 8), flowchart 900 (FIG. 9), and/or further embodiments described herein. Embodiments are directed to computer program products comprising such logic (e.g., in the form of software) stored on any computer useable medium. Such software, when executed in one or more data processing devices, causes a device to operate as described herein.

Conclusion

While various embodiments of the present invention have been described above, it should be understood that they have been presented by way of example only, and not limitation. It will be understood by those skilled in the relevant art(s) that various changes in form and details may be made therein without departing from the spirit and scope of the invention as defined in the appended claims. Accordingly, the breadth and scope of the present invention should not be limited by any of the above-described exemplary embodiments, but should be defined only in accordance with the following claims and their equivalents.

What is claimed is:

1. A method for ad-hoc entity extraction, comprising:
filtering a first set of documents to generate a second set of documents that includes documents of the first set based at least on a set of token sets that covers entity strings in a list of entity strings, the number of tokens in the set of token sets being less than the number of words of the entity strings in the list of entity strings, the set of tokens generated based on the entity strings in the list of the entity strings; and
performing entity recognition on the second set of documents.

2. The method of claim 1, wherein said filtering comprises:
querying an inverted index generated on the first set of documents using the set of covering token sets to determine a set of document identifiers for a subset of the documents in the first set;
retrieving a subset of documents from the first set identified by the set of document identifiers; and
performing entity string matching on the retrieved subset of documents.

3. The method of claim 2, further comprising:
performing said querying and said entity string matching in a manner that balances a first cost of said querying and a second cost of said entity string matching to reduce a sum of the first and second costs.

4. The method of claim 2, wherein said querying comprises:
querying the inverted index with a plurality of batch queries, each batch query using a subset of the set of covering token sets to query the inverted index.

5. The method of claim 2, further comprising:
generating the set of covering tokens to include at least some tokens that are included in a plurality of the entity strings to reduce a total number of tokens included in the set of covering tokens.

6. The method of claim 5, where said generating comprises:
generating the set of covering tokens according to a greedy heuristic.

7. The method of claim 1, wherein said filtering comprises:
filtering the first set of documents to generate the second set of documents to include documents of the first set having at least a partial match with at least one entity string in the list of entity strings.

8. The method of claim 1, further comprising:
generating a set of signatures for the entity strings in the list.

9. A system for ad-hoc entity extraction, comprising:
one or more processors;
a document filter configured to filter a first set of documents to generate a second set of documents that includes documents of the first set based at least on a set of token sets that covers entity strings in a list of entity strings,
the number of tokens in the set of token sets being less than the number of words of the entity strings in the list of entity strings,
the set of tokens generated based on the entity strings in the list of the entity strings; and
an entity recognition module configured to perform entity recognition on the second set of documents.

10. The system of claim 9, wherein the document filter comprises:
an inverted index querier configured to query an inverted index generated on the first set of documents using the set of covering token sets to determine a set of document identifiers for a subset of the documents in the first set;
a document retriever configured to retrieve a subset of documents from the first set identified by the set of document identifiers; and
an entity string matcher configured to perform entity string matching on the retrieved subset of documents.

11. The system of claim 10, wherein the inverted index querier is configured to query the inverted index with a plurality of batch queries, each batch query using a subset of the set of covering token sets to query the inverted index.

12. The system of claim 10, further comprising:
a covering token set determiner configured to generate the set of covering tokens to include at least some tokens that are included in a plurality of the entity strings to reduce a total number of tokens included in the set of covering tokens.

13. The system of claim 12, where the covering token set determiner is configured to generate the set of covering tokens according to a greedy heuristic.

14. The system of claim 9, wherein the document filter is configured to filter the first set of documents to generate the second set of documents to include documents of the first set having at least a partial match with at least one entity string in the list of entity strings.

15. A computer program product comprising a computer-readable storage memory having computer program logic recorded thereon for enabling a processor-based system to perform ad-hoc entity extraction according to a method that comprises:
filtering a first set of documents to generate a second set of documents that includes documents of the first set based at least on a list of entity strings a set of token sets that covers entity strings in a list of entity strings,
the number of tokens in the set of token sets being less than the number of words of the entity strings in the list of entity strings,
the set of tokens generated based on the entity strings in the list of the entity strings; and
performing entity recognition on the second set of documents.

16. The computer program product of claim 15, wherein said filtering comprises:
querying an inverted index generated on the first set of documents using the set of covering token sets to determine a set of document identifiers for a subset of the documents in the first set;
retrieving a subset of documents from the first set identified by the set of document identifiers; and
performing entity string matching on the retrieved subset of documents.

17. The computer program product of claim 16, wherein said querying comprises:
querying the inverted index with a plurality of batch queries, each batch query using a subset of the set of covering token sets to query the inverted index.

18. The computer program product of claim 16, the method further comprising:
generating the set of covering tokens to include at least some tokens that are included in a plurality of the entity strings to reduce a total number of tokens included in the set of covering tokens.

19. The computer program product of claim 18, where said generating comprises:
generating the set of covering tokens according to a greedy heuristic.

20. The computer program product of claim 15, wherein said filtering comprises:
filtering the first set of documents to generate the second set of documents to include documents of the first set having at least a partial match with at least one entity string in the list of entity strings.

* * * * *